United States Patent [19]

Moeder et al.

[11] 4,259,623
[45] Mar. 31, 1981

[54] SERIES-WOUND ELECTRIC MOTOR AND CONTROL SYSTEM FOR GOVERNING THE SPEED THEREOF

[75] Inventors: Helmut Moeder, Stuttgart; Guenter Schirmer, Ingersheim, both of Fed. Rep. of Germany

[73] Assignee: Robert Bosch GmbH, Stuttgart, Fed. Rep. of Germany

[21] Appl. No.: 122,687

[22] Filed: Feb. 19, 1980

[30] Foreign Application Priority Data

Feb. 20, 1979 [DE] Fed. Rep. of Germany ....... 2906388

[51] Int. Cl.³ ............................................. H02K 23/08
[52] U.S. Cl. ................................. 318/249; 318/331; 318/345 R
[58] Field of Search ............... 318/246, 249, 251, 252, 318/331, 345 R, 345 C, 345 D, 345 G, 345 H, 493, 508, 511, 519, 523, 527, 532, 533, 537, 812

[56] References Cited

U.S. PATENT DOCUMENTS

| 3,781,620 | 12/1973 | Toth | 318/331 |
| 3,875,485 | 4/1975 | Hornung | 318/246 |
| 4,168,454 | 9/1979 | Gmiender | 318/331 |

Primary Examiner—Gene Z. Rubinson
Assistant Examiner—John W. Redman
Attorney, Agent, or Firm—Michael J. Striker

[57] ABSTRACT

A series-wound electric motor is disclosed in which a triac or thyristor is placed in series with the armature winding and one of the field coils. Two control voltages and a reference voltage can be tapped off various points on the electric motor. By utilizing appropriate control circuitry, the current in the armature winding may be turned on and off, while current flow through the field coils can continue to flow. In this fashion, the speed of the motor can be accurately regulated within a permissible range of operating speeds, while maintaining a high efficiency comparable to the efficiency of an unregulated series-wound motor.

8 Claims, 2 Drawing Figures

SERIES-WOUND ELECTRIC MOTOR AND CONTROL SYSTEM FOR GOVERNING THE SPEED THEREOF

BACKGROUND OF THE INVENTION

1. Field of Invention

This invention pertains to series-wound motors which may be operated across an AC source and more particularly pertains to series-wound universal motors. Furthermore, this invention pertains to motors of this type in which the speed of the motor must be regulated so as to cause the motor to run at a constant speed.

2. Description of the Prior Art

Many methods have been proposed to enable the speed of a series-wound electric motor to be varied and regulated. In prior methods, it has been proposed to utilize a resistance bridge in series with the armature winding of the motor. In methods such as these, the speed of the motor may be varied by altering the voltage across the bridge, causing motor speed to increase with increases in armature current, and causing motor speed decrease with decreases in armature content.

Such methods have two disadvantages. Firstly, such methods involve a loss of power in the resistance bridge. This power loss can be significant, especially at low motor speeds when comparatively large amounts of power are dissipated in the bridge. Therefore, the power curves of electric motors utilizing these methods are not as good as the power curves of unregulated series-wound motors. Secondly, it is entirely possible that as armature current is caused to increase, magnetic saturation will occur. Thus, the magnetic field within the motor becomes completely independent of armature current and the motor becomes non-regulatable. When saturation occurs, the regulating control system becomes unstable and precise control of motor speed becomes impossible.

It would thus be desirable to provide a series-wound electric motor, particularly a universal motor which can be used an AC source which is so designed that the speed of the motor could be accurately controlled, and which is so designed that instabilities arising from saturation in the motor upon increased armature current would be avoided. Moreover, it would be desirable to provide such a motor which would be power-efficient over its entire range of operating speeds.

SUMMARY OF THE INVENTION

These objects, along with others which will become apparent hereinafter, are achieved by the use of an improved series-wound motor in which a thyristor is placed between the armature windings and one of the field coils of the motor. By firing the thyristor and cutting it off, the average current in the armature can be varied and the speed of the motor thereby controlled.

It is to be emphasized that the thyristor herein (which may be a silicon controlled rectifier or may be a triac) is located in the internal circuitry of the motor and is not merely in series with the motor in toto. It is known in the art to regulate the speed of a motor by turning the current through the motor on and off by means of such a thyristor. However, such thyristors, when so arranged, have the effect that current flows either through the armature and both field coils, or flows nowhere. However, in this invention, current may and indeed does flow through the field coils without flowing through the armature.

In this invention, the point at which the thyristor is connected to one of the field coils of the motor is tapped so as to obtain a reference voltage. A first control voltage is derived from that side of the armature winding which is unconnected to the thyristor. A second control voltage which approximates the voltage across the field coil to which the thyristor is connected is also obtained.

In this invention, the two control voltages are rectified in opposite senses and then added together. The resultant sum is then subtracted from the reference voltage and appropriate circuitry is used to cause the armature current to be so varied that the time average of the difference between the sum of the control voltages and the reference voltage is zero. As will be seen hereinafter, the armature current can be varied without greatly affecting the voltages across the field coils of the motor, eliminating instability in the speed regulating control system which would otherwise be caused in the event that armature saturation occurred. Because the thyristor dissipates comparatively small amounts of power, the power curve of the motor over its range of operating speeds is essentially as good as the power curve for an unregulated series-wound motor. Additionally, by taking one of the control voltages off the tap of a potentiometer, the speed of the motor may be increased and decreased by operation of the potentiometer without substantial effect on power efficiency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
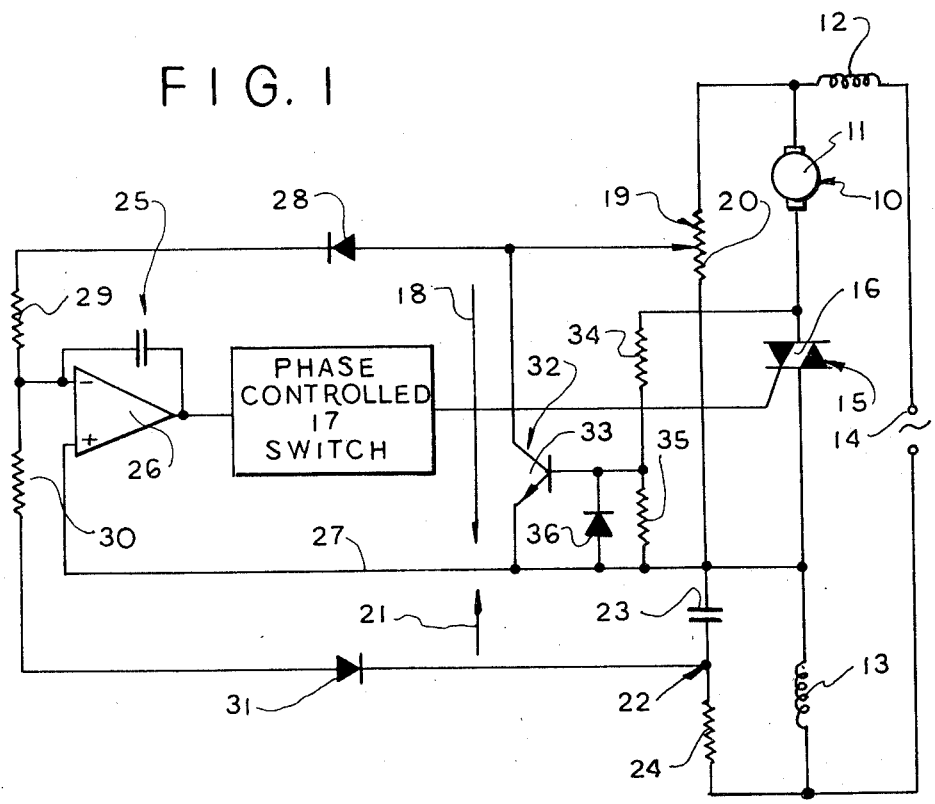
FIG. 1 is a schematic diagram showing the electrical circuit of the invention and a control system used to operate it.

A series-wound electric motor, particularly a universal motor, has an armature 10 on which an armature winding 11 is wound. It will be appreciated by those skilled in the art that for purposes of this discussion, the armature winding will be referred to in the singular case even though in actuality there are a plurality of such windings on the armature. A first field coil 12, shown in FIG. 1 as a resistance, is placed in series with a first side of the armature winding 11. On a second side of the armature winding 11, a triac 16 is connected, and the triac is further connected in series with a second field coil 13, also shown as a resistance in FIG. 1. An AC source 14 is connected to those ends of the first and second field coils which are unconnected to the armature winding 11 and the triac 16. Thus, it may be seen that when the triac conducts, current can flow through the armature and the field coils and the armature will rotate. It will be apparent to those skilled in the art that because of inertia, the speed of the motor can be regulated by turning the triac 16 on and off, since the motor does not stop when the triac is cut off and does not immediately reach full speed when the triac fires.

As can be seen in FIG. 1, a series network including capacitor 23 and resistor 24 is placed in parallel across second field coil 13, with resistor 24 being connected to the AC source 14. A model of this series parallel network appears in FIG. 2.

Figure 2:
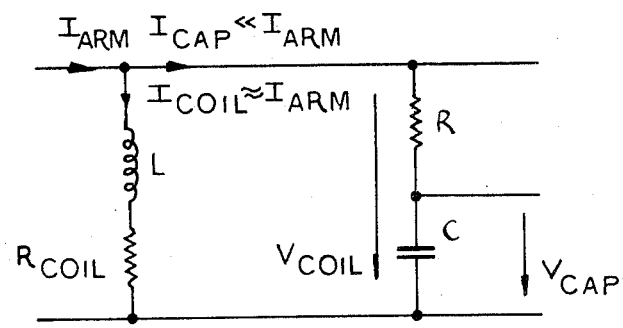
FIG. 2 is a schematic diagram which models the operation of a portion of the invention.

As can be seen therein, the second field coil 13 can be represented as an inductance L placed in series with a resistance $R_{coil}$ for purposes of analysis. Thus, as is shown in FIG. 2, the series-parallel network which includes capacitor 23, resistor 24, and second field coil 13 can be considered to be a parallel network in which one branch includes an inductance L and a resistance $R_{coil}$ and the other branch includes a resistance R (representing the resistance of the resistor 24) and a capacitance C (representing the capacitance of capacitor 23).

The value of R, i.e., the resistance of resistor 24, is chosen to be large. In this case, it will be clear to one skilled in the art that the current flowing through the resistor 24 will be much less than the current flowing through the armature winding 11. The current flowing through the armature winding 11 (here denoted $I_{arm}$) can thus be said to be approximately equal to the current flowing through the second field coil 13. This approximation becomes more accurate as the current flowing through resistor 24 decreases as a result of the selection of the value R to be sufficiently high. In order to compute the relationship between the voltage across capacitor 23 (denoted $V_{cap}$) and the voltage across the second field coil 13 (here denoted $V_{coil}$) can be determined according to standard AC theory by utilizing the following equations:

$$V_{cap} = V_{coil} \cdot \frac{1/j\omega C}{R + 1/j\omega C}$$
$$= I_{arm}(R_{coil} + j\omega L) \cdot \frac{1/j\omega C}{R + 1/j\omega C}$$
$$= I_{arm} \cdot \frac{(R_{coil} + j\omega L)}{1 + j\omega RC}$$
$$= I_{arm} \cdot R_{coil} \cdot \frac{1 + j\omega L/R_{coil}}{1 + j\omega RC}$$

It can be seen from these equations that when it is assumed that the amount of current passing through the capacitor 23 is extremely small as compared with the current passing through the armature winding 11 (an assumption easily justified by choosing resistor 24 sufficiently high) that the voltage across the capacitor 23 will vary in proportion to the current through the armature. If the values of the capacitor 23 and the resistor 24 are so chosen that $$R \cdot C = L/R_{coil}$$

then the voltage across the capacitor 23 will, by substitution, be governed by the following equations:

$$V_{cap} = I_{arm} \cdot R_{coil} \cdot \frac{1 + j\omega L/R_{coil}}{1 + j\omega L/R_{coil}}$$
$$V_{cap} = I_{arm} \cdot R_{coil}$$

and since it is assumed that the current passing through armature winding 11 is equal to the current passing through the second field coil 13, $$V_{cap} = V_{coil}.$$

Thus, utilizing the assumption that current through capacitor 23 is extremely small as compared with the current passing through the second field coil 13, and choosing R and C so as to satisfy a condition in which the product of R and C is equal to the quotient of L and $R_{coil}$, it can be seen that the voltage across capacitor 23 equals, for all practical purposes, the voltage across the second field coil 13.

In this invention, the voltage of the point at which the triac 16 is connected to the second field coil 13 is used as a reference voltage. The voltage across the capacitor 23 (i.e. the voltage across the second field coil 13) is used as a second control voltage. Moreover, it can be seen that a potentiometer 20 is placed across a series network that includes the armature winding 11 and the triac 16, and is thus connected to one end of capacitor 23. A first control voltage can thus be derived from tap 19 of potentiometer 20.

Hence, by arranging the triac 16 in series with the armature winding 11 and the second field coil 13 as has been described above, and by arranging the potentiometer 20, capacitor 23, and resistor 24 as has also been described above, a first control voltage, a second control voltage, and a reference voltage can be obtained. All these voltages will be in phase with one another. Moreover, as will be seen hereinafter, the amounts of current which are drawn away from the first field coil 12, the second field coil 13, and the armature winding 11 as a result of the utilization of these control voltages are extremely small. Thus, it can be said that the current flowing through the armature winding 11 can be varied independently of the current passing through the field coils 12 and 13.

Referring once again to FIG. 1, it can be seen that semiconductor diode 28 connects resistor 29 to top 19 of potentiometer 20 with the anode of semiconductor diode 28 being connected to tap 19 and the cathode of semiconductor diode 28 being connected to resistor 29. Similarly, a semiconductor diode 31 connects the common connection point between capacitor 23 and resistor 24 to resistor 30, with the anode of semiconductor diode 31 being connected to resistor 30 and the cathode of semiconductor diode 31 being connected between the capacitor 23 and the resistor 24. Thus diodes 28 and 31 rectify, respectively, the first and second control voltages that are utilized in this system. Moreover, the rectification occurs in an anti-parallel sense, so that only positive cycles of the first control voltage will be transmitted to resistor 29 and only negative cycles of the second control voltage will be transmitted to resistor 30.

As can further be seen in FIG. 1, resistors 29 and 30 are connected together at those ends which are remote from the diodes 28 and 31. Thus, the voltage at the point at which resistors 29 and 30 are connected together will be equal to the sum of the rectified control voltages. Because the rectifications occur in opposite senses, the voltage at the common connection point between resistor 29 and resistor 30 will have a lesser absolute magnitude than the absolute magnitudes of either the rectified first control voltage or the rectified second control voltage.

The common connection point between resistor 29 and resistor 30 is connected to the inverting input of an operational amplifier 26. The reference voltage is routed to the non-inverting input of operational amplifier 26. Because the output of the operational amplifier 26 is connected to the inverting input by way of a capacitor 25, it can be seen that the operational amplifier 26 is connected as a time integrator. Those skilled in the art will readily understand that when an operational amplifier is connected as is the operational amplifier 26 herein, the voltage at the output thereof will be equal to the time average of the difference between the voltages appearing at the inputs of the operational amplifier. Thus, operational amplifier 26 produces an output signal which is the time average of a difference between the reference voltage and a sum that includes the positive cycles of the first control voltage and the negative cycles of the second control voltage.

The output of operational amplifier 26 is connected to a phase-controlled switch 17, which is in turn connected to the gate of triac 16. As is well known to those skilled in the art, the triac 16 will only allow current to be supplied through the armature winding 11 when the gate of the triac 16 carries a voltage that is sufficiently high so as to enable the triac 16 to fire. Otherwise, the triac 16 is cut off and no current can flow in the armature 11. It may also be seen that when the current passing through the armature winding 11 is too large, the output of the operational amplifier 26 will increase to the point that phase-controlled switch 17 causes the triac 16 to cut off. Thus, by appropriately firing the triac 16, a proper average armature current in the armature winding 11 may be maintained and the speed of the motor thereby controlled.

When the triac 16 is cut off, it will be immediately apparent that no voltage will appear at the non-inverting input of operational amplifier 26, since the triac 16 does not conduct. To maintain the reference voltage during cutoff of triac 16, a holding circuit generally indicated by the reference numeral 32 is provided. The holding circuit includes an NPN transistor 33, a voltage divider including resistors 34 and 35, and a semiconductor diode 36. The voltage divider is connected across the triac 16, and the base of transistor 33 is connected to the midpoint of the voltage divider between resistors 34 and 35. The collector of transistor 33 is connected to the tap 19 of potentiometer 20 and the anode of diode 28, and the emitter of transistor 33 is connected to the non-inverting input of the operational amplifier 26. Moreover, the emitter of transistor 33 and the base of transistor 33 are connected together by diode 36, with the anode of diode 36 being connected to the emitter and the cathode of diode 36 being connected to the base.

When the triac 16 fires, there is for practical purposes no voltage across it. Thus, no current will flow through resistors 34 and 35 and no current will flow into the base of transistor 33. Thus, when the triac 16 fires, transistor 33 is turned off and conducts no current between its collector and its emitter. However, when triac 16 is cut off by virtue of an excessive armature current, a voltage does appear across resistors 34 and 35 and current flows through the base of transistor 33, turning the transistor 33 on and allowing current to flow from the collector to the emitter. Thus, neglecting the voltage drop across transistor 33, the reference voltage will be maintained at the voltage of the first control voltage which is derived from the top 19 of potentiometer 20. The holding circuit is thus provided to insure that the reference voltage is always present at the non-inverting input of the operational amplifier 26 and is thus always available to enable the triac 16 to be fired at an appropriate time in order to maintain the armature content at its proper average value. Diode 36 prevents the transistor 33 from burning out as a result of reverse EMF developed by cutoff of triac 16 and alternations in the direction of current coming from the AC source 14.

It can now be seen that since the reference voltage is not interrupted as a result of the cutoff of triac 16, that the operational amplifier 26 will drive the phase-controlled switch 17 in such a fashion that the current at the non-inverting input of the operational amplifier 26 will be zero and the positive cycles of the first control voltage and the negative cycles of the second control voltage will, averaged over time, cancel each other out.

The potentiometer 20 will have, at its top 19, a voltage which is the voltage across the armature winding 11 multiplied by a factor k, which factor depends upon the position to which the potentiometer 20 is set. (For this purpose, the voltage drop across triac 16 can be neglected.) Since the current through the resistors 29 and 30 will be equal to the voltages across them divided by their resistances $$\frac{k \cdot V_{arm}}{R_{29}} - \frac{I_{arm} \cdot R_{coil}}{R_{30}} = 0$$

and $$k = \frac{R_{29} \cdot R_{coil}}{R_{30}} \cdot \frac{I_{arm}}{V_{arm}}$$

where
$R_{29}$ = resistance of resistor 29
$R_{30}$ = resistance of resistor 30
$R_{coil}$ = resistance of second field coil 13
$I_{arm}$ = current through armature winding 11
$V_{arm}$ = voltage across armature winding 11
k = fraction of $V_{arm}$ which is used as the first control voltage.

Hence, since $R_{29}$, $R_{30}$, and $R_{coil}$ are fixed, variation of k by adjustment of potentiometer 20 will cause the speed of the motor to vary by varying the fraction $I_{arm}/V_{arm}$. Thus, the operating speed of the motor can be changed.

It is known to those skilled in the art that operational amplifiers and phase control switches are high impedance devices which draw current which is negligible in comparison with the current drawn by the motor. Likewise, the current flowing through transistor 33 and the voltage divider made up of resistors 34 and 35 is also small. Hence, the operation of this system does not cause the current drawn by the field coils 12 and 13 to vary to any significant extent. Thus, instabilities are avoided. The phase-controlled switch 17 can be so operated that the firing of the triac 16 can occur at or immediately adjacent to the times when the voltage from the AC source 14 is equal to zero. This can avoid interference with the AC source 14. In the event that this invention is utilized to power an electric motor used in a home tool, other appliances such as radios, television sets and the like will not be subjected to line interference.

The power supply for phase-controlled switch 17 is not shown in FIG. 1. Those skilled in the art will readily understand that a suitable power supply can be taken directly across the AC source 14. A suitable phase-controlled switch 17, which also happens to incorporate an integrated operational amplifier 26 is manufactured by AEG TELEFUNKEN under Model No. U 111 B. It is, of course, possible to utilize a separate integrated operational amplifier 26 and a separate phase controlled switch 17.

In the preferred embodiment, the triac 16 will be included within the motor housing proper, and the rest of the circuitry may also be included therein. If desired, a silicon controlled rectifier may be substituted for the thyristor 16.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electronic control system for use with a series-wound electric motor having a first field coil, a second field coil and an armature winding, in which motor the first field coil is connected to a first side of the armature winding a first side of a thyristor is connected to the armature winding and the second field coil is connected to the second side of the thyristor which system is designed to allow motor speed regulation by appropriately firing the thyristor in accordance with a first control voltage, a second control voltage, and a reference voltage, when the first control voltage is derived from the first side of the armature winding, the second control voltage approximates a voltage across the second field coil and the reference voltage is a voltage at a point intermediate the thyristor and the second field coil, comprising:

a differential amplifier having an inverting input, a non-inverting input, and an output, the differential amplifier being so connected that a voltage at the output is equal to a time average of a difference between voltages appearing at its inputs and a sum of positive cycles of one of the control voltages and negative cycles of another of the control voltages appears at one of the inputs and the reference voltage appears at another of the inputs;

a trigger circuit connected between the output of the differential amplifier and the thyristor and operating in a manner as to fire and cut off the thyristor in accordance with voltages appearing at the output of the differential amplifier; and a holding circuit operating in a manner that the reference voltage is maintained while the thyristor is cut off.

2. The improvement defined by claim 1, wherein the thyristor is unilateral and is a silicon controlled rectifier.

3. The improvement defined by claim 1, wherein the thyristor is bilateral and is a triac.

4. The system defined by claim 2 or 3 wherein the trigger circuit is a phase controlled switch.

5. The system defined by claim 4 wherein the differential amplifier is an operational amplifier.

6. The system defined by claim 5 wherein voltages at the inverting input of the operational amplifier are equal to a sum of positive cycles of the first control voltage and negative cycles of the second control voltage, and wherein the reference voltage appears at the non-inverting input of the operational amplifier.

7. The system defined by claim 2 or 3, wherein the holding circuit includes a transistor having its base biased by a voltage divider network, and wherein the voltage divider network is in parallel with the thyristor.

8. The system defined by claim 2 or 3, wherein the first control voltage is derived from a tap on a potentiometer placed in parallel with a series network, and wherein the series network includes the armature winding and the thyristor.

* * * * *